US012061718B2

(12) United States Patent
Baker et al.

(10) Patent No.: US 12,061,718 B2
(45) Date of Patent: Aug. 13, 2024

(54) SYSTEMS AND METHODS FOR DETECTING AND MANAGING SENSITIVE INFORMATION

(71) Applicant: Capital One Services, LLC, McLean, VA (US)

(72) Inventors: Rodney Baker, McLean, VA (US); Carlos Padilla, Lake Zurich, IL (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 346 days.

(21) Appl. No.: 17/510,486

(22) Filed: Oct. 26, 2021

(65) Prior Publication Data

US 2023/0125983 A1    Apr. 27, 2023

(51) Int. Cl.
*G06F 21/62*  (2013.01)
*G06F 21/60*  (2013.01)
*G06N 3/04*  (2023.01)

(52) U.S. Cl.
CPC ........ *G06F 21/6245* (2013.01); *G06F 21/602* (2013.01); *G06N 3/04* (2013.01)

(58) Field of Classification Search
CPC .......... G06N 3/02; G06N 3/04; G06N 3/0464; G06N 3/0475; G06N 3/0495; G06N 3/0499; G06F 21/6245; G06F 21/602
See application file for complete search history.

(56) References Cited

U.S. PATENT DOCUMENTS

| | | | |
|---|---|---|---|
| 10,728,384 B1 * | 7/2020 | Channakeshava | G06F 21/6245 |
| 10,984,316 B2 | 4/2021 | Qiao et al. | |
| 11,461,495 B2 * | 10/2022 | Turano | G06F 21/6245 |
| 2015/0007336 A1 * | 1/2015 | Zang | G06Q 10/107 |
| | | | 726/26 |

(Continued)

FOREIGN PATENT DOCUMENTS

WO    2017214608 A1    12/2017

OTHER PUBLICATIONS

Sambamoorthy, Arjun, "Reinventing DLP with Natural Language Understanding," Armorblox, Sep. 20, 2019; (https://www.armorblox.com/blog/reinventing-dlp-with-natural-language-understanding/) (4 pages).

*Primary Examiner* — Jonathan A Bui
(74) *Attorney, Agent, or Firm* — Troutman Pepper Hamilton Sanders LLP; Christopher J. Forstner; John A. Morrissett (57) ABSTRACT

The disclosed technology includes systems and methods of identifying and managing sensitive information. The method can include detecting data entered into a form on a user interface, and generating, by a natural language understanding model, comprehension data based on the data entered into the form. The method can include determining, by a machine learning model, a risk score of the data and determining whether the risk score is greater than or equal to a threshold risk score. In response to determining that the risk score is greater than or equal to the threshold risk score, (Continued)

the method can include outputting a message to the user interface to alert a user that the data likely comprises sensitive information. The method can include receiving an input from the user interface indicative of whether the data comprises sensitive information and storing the data, the risk score, and the input in a database.

16 Claims, 5 Drawing Sheets

(56) References Cited

U.S. PATENT DOCUMENTS

| | | | |
|---|---|---|---|
| 2015/0161483 A1* | 6/2015 | Allen | G06V 40/16 |
| | | | 382/118 |
| 2020/0004980 A1* | 1/2020 | Blass | G06F 21/10 |
| 2020/0387623 A1* | 12/2020 | Bayon | H04L 9/3242 |
| 2021/0124844 A1* | 4/2021 | Ghazinour Naini | |
| | | | G06F 21/6263 |
| 2021/0157950 A1* | 5/2021 | Turano | G06F 21/6245 |
| 2022/0245277 A1* | 8/2022 | Springer | H04L 63/102 |
| 2022/0245283 A1* | 8/2022 | Springer | G06F 21/84 |
| 2023/0153462 A1* | 5/2023 | Tutuianu | G06N 7/01 |
| | | | 726/26 |
| 2023/0206420 A1* | 6/2023 | Wang, Sr. | G06T 7/0004 |
| | | | 382/141 |
| 2023/0244812 A1* | 8/2023 | James Stephen | H04L 41/22 |
| | | | 726/26 |

* cited by examiner

SYSTEMS AND METHODS FOR DETECTING AND MANAGING SENSITIVE INFORMATION

FIELD

The disclosed technology relates to systems and methods for detecting and managing sensitive information. In particular, the disclosed technology relates to systems and methods for automatically detecting sensitive information entered into a form on a user interface and then determining how to manage the sensitive information.

BACKGROUND

Organizations are often faced with the challenge of protecting customer's sensitive or confidential information from potentially damaging data leaks. The financial and administrative cost of managing sensitive information and protecting against data leaks continues to rise with increasing regulatory requirements and threats of attacks by malicious parties. Although some organizations utilize data loss prevention software and encrypt sensitive data to reduce the likelihood of the sensitive information getting into the wrong hands, the best protection against a data leak is to never store the sensitive information in the first place. With this in mind, many businesses have implemented internal policies that require employees to limit the amount and type of sensitive information that can be stored by the organization. Unfortunately, even with robust policies in place, sensitive information can still be intentionally or unintentionally stored by the organization and then later accessed and used by employees.

More recently, some organizations have begun to utilize software that can detect sensitive information to help remove or prevent sensitive information from being stored on the organization's servers or systems. Existing software capable of detecting sensitive information, however, is often ineffective at identifying and preventing the sensitive information from being stored by the organization. This is due in part because existing sensitive information detection software operates by recognizing regular expressions (regex) that are present in data, but regex patterns are generally not detected if the software is not specifically programmed to identifying a given set of sensitive information. Furthermore, using regex patterns leads to a high number of false positives which can cause users of the software to ignore messages indicating that the data contains sensitive information. To further complicate matters, it can be quite easy to circumvent the sensitive information detection software by simply changing the way the sensitive information is expressed. For example, sensitive information detection software can sometimes be circumvented by simply writing a credit card number out as a combination of words and numbers (e.g., "12three4 5six7eight" etc.) instead of a simple string of numbers. Therefore, even with robust policies and utilizing sensitive information detection software, organizations still find themselves storing far more sensitive information than necessary and are therefore exposed to the liability that can come with a data leak.

Accordingly, there is a need for improved systems and methods for identifying and managing sensitive information. Embodiments of the present disclosure are directed to this and other considerations.

SUMMARY

The disclosed technology can include a method of identifying and managing sensitive information. The method can include detecting, by an application of a computing device, data entered into a form on a user interface and generating, by a natural language understanding model, comprehension data based on the data entered into the form. The method can further include determining, by a machine learning model and based on the comprehension data, a risk score of the data. The risk score can be indicative of a likelihood that the data comprises sensitive information.

The method can further include determining whether the risk score is greater than or equal to a threshold risk score. In response to determining that the risk score is greater than or equal to the threshold risk score, the method can include outputting a message to the user interface to alert a user that the data likely comprises sensitive information. The method can further include receiving, from the user via the user interface, an input indicative of whether the data comprises sensitive information and tokenizing, encrypting, and storing the comprehension data, the risk score, and the input in a database.

The disclosed technology can include a method of identifying and managing sensitive information. The method can include detecting, by an application of a computing device, data entered into a form on a user interface and transmitting, by the application of the computing device, the data to a remote machine learning service. The remote machine learning service can be a natural language understanding model. The method can include receiving, from the remote machine learning service, comprehension data indicative of a context of the data as determined by the remote machine learning service. The method can include determining, by a machine learning model and based on the comprehension data, a risk score of the data. The risk score can be indicative of a likelihood that the data comprises sensitive information. The method can include determining whether the risk score is greater than or equal to a threshold risk score. In response to determining that the risk score is greater than or equal to the threshold risk score, the method can include outputting a message to the user interface to alert a user that the data likely comprises sensitive information and tokenizing, encrypting, and storing the comprehension data and the risk score in a database.

The disclosed technology can include a system for identifying and managing sensitive information. The system can include one or more processors and a memory in communication with the one or more processors. The memory can store instructions that are configured to cause the system to detect data entered into a form on a user interface and generate, by a natural language understanding model, comprehension data based on the data entered into the form. The instructions can further cause the system to determine, by a machine learning model and based on the comprehension data, a risk score of the data. The risk score can be indicative of a likelihood that the data comprises sensitive information. The instructions can further cause the system to determine whether the risk score is greater than or equal to a threshold risk score. In response to determining that the risk score is greater than or equal to the threshold risk score, the instructions can cause the system to output a message to the user interface to alert a user that the data likely comprises sensitive information.

Further features of the disclosed design, and the advantages offered thereby, are explained in greater detail hereinafter with reference to specific examples illustrated in the accompanying drawings, wherein like elements are indicated by like reference designators.

BRIEF DESCRIPTION OF THE DRAWINGS

Reference will now be made to the accompanying drawings, which are not necessarily drawn to scale, and which illustrate various implementations, aspects, and principles of the disclosed technology.

DETAILED DESCRIPTION

Examples of the present disclosure relate to systems and methods for automatically identifying and managing sensitive information that is entered into a form on a user interface (e.g., a free-form text field). The disclosed technology can help to limit and track the amount of sensitive information stored by an organization. The disclosed technology includes a machine learning algorithm that is configured to detect sensitive information, determine a risk score of the sensitive information (i.e., a likelihood that the data comprises sensitive information and/or a risk associated with the type of sensitive information) and then take actions based on the risk score. For example, if the risk score is greater than a threshold risk score, the disclosed technology can output a message alerting the user that the data contains sensitive information, output inquiries to a user interface to obtain additional information from the user, mark and track the sensitive information if it is stored on the company's servers, and/or other actions that can help to manage identified sensitive information. In this way, the disclosed technology can be used to reduce the amount of sensitive information stored by an organization and determine an overall cumulative risk associated with sensitive information stored by an organization. Furthermore, the disclosed technology can include training of the machine learning model to ensure the machine learning model is able to identify sensitive information before it is stored. As will become apparent throughout this disclosure, the machine learning model can become better able to accurately identify sensitive information as the machine learning mode is trained over time.

Although various aspects of the disclosed technology are explained in detail herein, it is to be understood that other aspects of the disclosed technology are contemplated. Accordingly, it is not intended that the disclosed technology is limited in its scope to the details of construction and arrangement of components expressly set forth in the following description or illustrated in the drawings. The disclosed technology can be implemented and practiced or carried out in various ways. In particular, the presently disclosed subject matter is described in the context of being systems and methods for identifying and managing sensitive information. The present disclosure, however, is not so limited, and can be applicable in other contexts in which data is provided by a human and entered into a computing system. For example, the disclosed technology can be applicable to systems in which a human can enter data via a keyboard, a mouse, a microphone (e.g., interactive voice response (IVR)), or other devices configured to provide data from a human to a computing system. Accordingly, when the present disclosure is described in the context of systems and methods for identifying and managing sensitive information, it will be understood that other implementations can take the place of those referred to.

It should also be noted that, as used in the specification and the appended claims, the singular forms "a," "an," and "the" include plural references unless the context clearly dictates otherwise. References to a composition containing "a" constituent is intended to include other constituents in addition to the one named.

Also, in describing the disclosed technology, terminology will be resorted to for the sake of clarity. It is intended that each term contemplates its broadest meaning as understood by those skilled in the art and includes all technical equivalents which operate in a similar manner to accomplish a similar purpose.

Ranges may be expressed herein as from "about" or "approximately" or "substantially" one particular value and/or to "about" or "approximately" or "substantially" another particular value. When such a range is expressed, the disclosed technology can include from the one particular value and/or to the other particular value. Further, ranges described as being between a first value and a second value are inclusive of the first and second values. Likewise, ranges described as being from a first value and to a second value are inclusive of the first and second values.

Herein, the use of terms such as "having," "has," "including," or "includes" are open-ended and are intended to have the same meaning as terms such as "comprising" or "comprises" and not preclude the presence of other structure, material, or acts. Similarly, though the use of terms such as "can" or "may" are intended to be open-ended and to reflect that structure, material, or acts are not necessary, the failure to use such terms is not intended to reflect that structure, material, or acts are essential. To the extent that structure, material, or acts are presently considered to be essential, they are identified as such.

It is also to be understood that the mention of one or more method steps does not preclude the presence of additional method steps or intervening method steps between those steps expressly identified. Moreover, although the term "step" can be used herein to connote different aspects of methods employed, the term should not be interpreted as implying any particular order among or between various steps herein disclosed unless and except when the order of individual steps is explicitly required. Further, the disclosed technology does not necessarily require all steps included in the methods and processes described herein. That is, the disclosed technology includes methods that omit one or more steps expressly discussed with respect to the methods described herein.

The components described hereinafter as making up various elements of the disclosed technology are intended to be illustrative and not restrictive. Many suitable components that would perform the same or similar functions as the components described herein are intended to be embraced within the scope of the disclosed technology. Such other components not described herein can include, but are not limited to, similar components that are developed after development of the presently disclosed subject matter.

As used herein, the term "sensitive information" can include any information that would be considered by one of ordinary skill in the art to be information that should not be shared with anyone other than those who have a need to know the information. As non-limiting examples, sensitive information can include personally identifiable information, highly sensitive human data (HSHD), confidential information, financial data, identification data, business know how and trade secrets, security information, health information, or any other information that would reasonably be considered as sensitive information.

Reference will now be made in detail to example embodiments of the disclosed technology that are illustrated in the accompanying drawings and disclosed herein. Wherever convenient, the same reference numbers will be used throughout the drawings to refer to the same or like parts.

Figure 1:
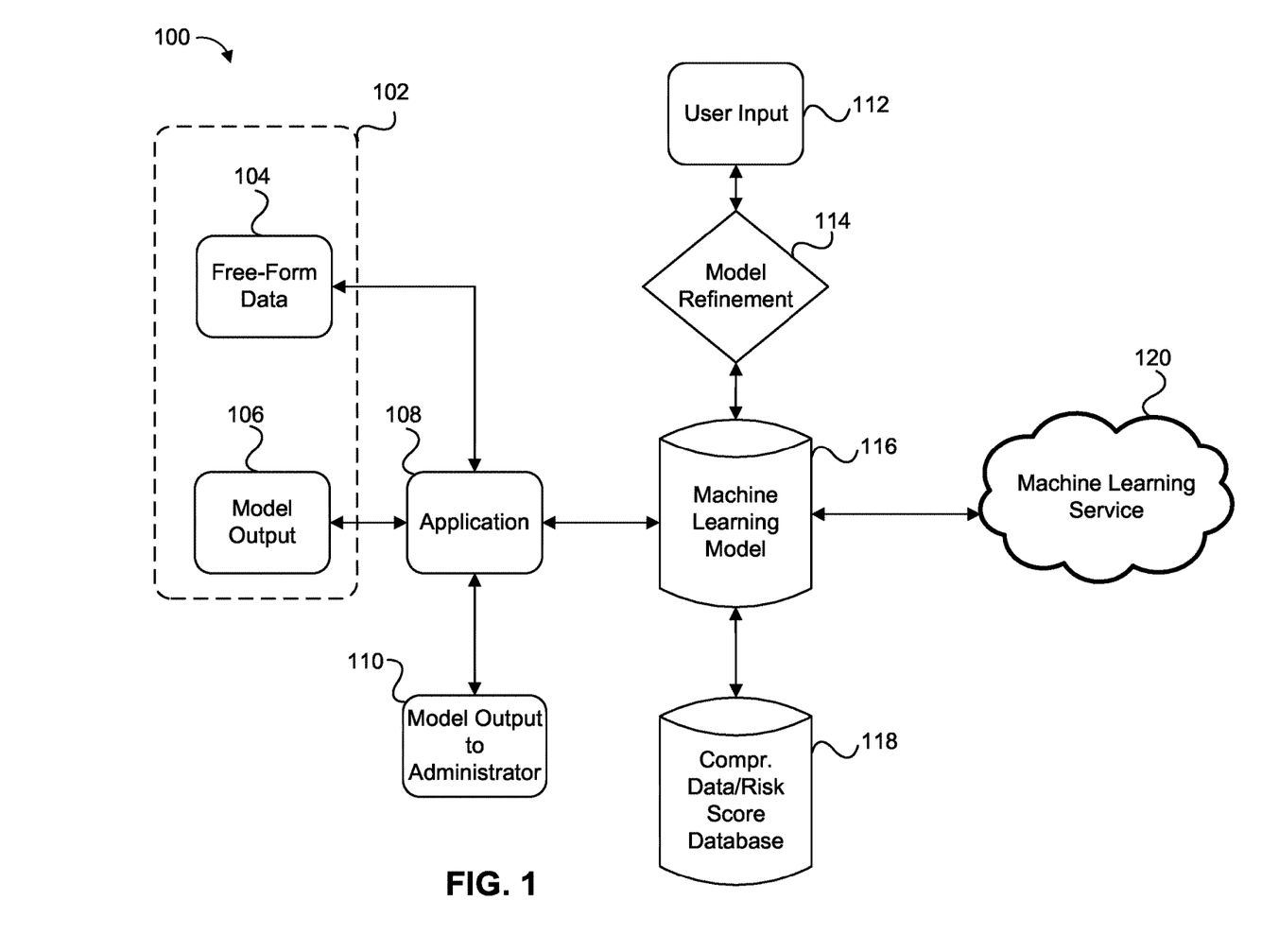
FIG. 1 illustrates an example system for identifying and managing sensitive information, in accordance with an example of the disclosed technology.

FIG. 1 illustrates an example system 100 for detecting and managing sensitive information, in accordance with an example of the disclosed technology. One of skill in the art will appreciate that the various features of the system 100 described herein can be incorporated into a single computing device or be divided into distinct parts across a network of computing devices. Thus, although the various features of the system 100 may be described as separate and distinct features or components, the described technology is not so limited.

The system 100 can include a user interface 102 that can be configured to receive inputs from a user and display data for the user to view. As a non-limiting example, the user interface 102 can be a screen of a computing device that is configured to display data for the user. The user interface 102 can receive an input from a user, for example, by a touch screen, a mouse, a keyboard, or other methods of inputting data to a user interface as is known in the art.

The user interface 102 can be configured to receive free-form data 104 (e.g., via a free-form text field) entered by the user and display the free-form data 104 on the user interface 102. The free-form data 104 can be, for example, text or numbers entered into a free-form text field by the user and is not limited to a predetermined field, term, string of characters, numbers or other specific data. To illustrate, the user interface 102 can be configured to display a free-form text field on a web browser or an application in which a user can enter any free-form data 104 (e.g., via typing on a keyboard, speaking into a microphone and transcribing the data, clicking inputs with a mouse, etc.) and the free-form data 104 can be displayed on the user interface 102.

The user interface 102 can be further configured to display a model output 106 that can comprise information generated by a machine learning model 116 as will be described in greater detail herein. Among other examples that will be described herein, the model output 106 can be or include a message for display on the user interface 102 to alert the user that the free-form data 104 likely contains sensitive information.

The system 100 can include an application 108 that can be in communication with the user interface 102 and a machine learning model 116. As non-limiting examples, the application 108 can be an extension of a browser, a software program, a program or feature of a kernel of the system 100, or any computer application that can perform the functions described herein. The application 108 can detect the free-form data 104 when it is entered into a form by a user of the user interface 102. In response to detecting the free-form data 104 entered into the form, the application 108 can send the detected free-form data 104 to a machine learning model 116. To illustrate, if a user of the user interface 102 enters a social security number into a free-form text field displayed on the user interface 102, the application 108 can detect the data associated with the social security number and send the data to the machine learning model 116 (e.g., send a copy of the social security number to the machine learning model 116). The application 108 can further receive data from the machine learning model 116 and output the data to the user interface 102 as a model output 106. The model output 106 can be, for example, a message to alert the user of the user interface 102 that the data entered into the free-form text field likely includes sensitive information. Continuing the previous example, the application 108 can output the model output 106 to the user interface 102 to alert the user that the free-form data 104 (in this example, a social security number) likely contains sensitive information.

The application 108 can be further configured to output a model output to an administrator 110. The model output to the administrator 110 can be, for example, an alert sent to a computing device used by an administrator or other member of an organization that utilizes the system 100 to detect, reduce, and track sensitive information stored by the organization. As will be appreciated, by configuring the application 108 to output the model output to an administrator 110, the disclosed technology can be configured to alert the members of the organization that should be made aware of any sensitive information stored by the organization. By being aware of what sensitive information is stored by the organization, the organization can be better able to assess the risk associated with storing the sensitive information to help make informed business decisions. Furthermore, by outputting a model output to the administrator 110, the administrator can be made aware of the types, amount, and frequency of sensitive information that members of the organization are attempting to store so that the organization can develop training programs to instruct members of the organization how to identify and properly manage sensitive information.

The machine learning model 116 can be a single machine learning model or multiple machine learning models configured to interpret the free-form data 104, determine a likelihood that the free-form data 104 comprises sensitive information, and perform actions based on whether the risk score is equal to or greater than a threshold risk score. The machine learning model 116 (or multiple machine learning models 116) can be stored and executed locally on a computing device associated with the user interface 102, stored and executed remotely on a server, or stored and executed across multiple computing devices and/or servers.

In some examples, the machine learning model 116 can receive the free-form data 104 from the application 108 and interpret the free-form data 104 to determine a meaning of the free-form data 104. For example, the machine learning model 116 can comprise a natural language understanding (NLU) model that can interpret a meaning of the free-form data 104. To illustrate, if a user of the user interface 102 were to enter a social security number that comprises a combination of words and numbers (e.g., 1two3-four5-6seven89), existing systems would be unable to determine that the free-form data 104 comprises a social security number. By utilizing an NLU model to interpret the free-form data 104, the machine learning model 116 can interpret the combination of words and numbers as being sensitive information. As another example, the NLU model can be configured to determine a context or meaning behind the free-form data 104. For example, existing systems are programmed to detect predetermined words or phrases but are otherwise ineffective in detecting variations of those words or phrases.

By utilizing an NLU model, however, the machine learning model 116 can be configured to detect and learn a meaning or context behind the free-form data 104. In this way, the disclosed technology can more effectively determine whether sensitive information is contained in the free-form data 104.

The machine learning model 116 can be configured to generate comprehension data based on the machine learning model's 116 interpretation of the free-form data 104. In other words, the machine learning model 116 can be configured to generate data that comprises the machine learning model's 116 interpretation of the free-form data 104. To continue with the previous example of the social security number comprising numbers and words (e.g., 1two3-four5-6seven89), the machine learning model 116 would be able to generate comprehension data that interprets the free-form data 104 as being a string of nine numbers which could indicate that the numbers are a social security number. In other examples, the machine learning model 116 may generate comprehension data that interprets the free-form data 116 as being a string of nine numbers and that the free-form data 104 contains a social security number. As will be appreciated by one of skill in the art, the previous example is offered for illustrative purposes and the machine learning model 116 can be configured to generate comprehension data for any free-form data 104 provided to the machine learning model 116.

In some examples, the system 100 can include, or be connected to, a machine learning service 120. The machine learning service 120 can be, for example, a connected machine learning service 120 that comprises an NLU model. In this way, the system 100 can be configured to send the free-form data 104 to the connected machine learning service 120 to allow the connected machine learning service 120 to perform the function of interpreting the free-form data 104. In other words, the system 100 can utilize the benefits of existing cloud machine learning services such as NLU models that are available through companies like Amazon, Google, IBM, Microsoft, or any other available machine learning service 120. If the system 100 is configured to utilize a machine learning service 120, the system 100 can receive the comprehension data from the machine learning service 120. In other words, the machine learning service 120 can perform the function of interpreting the free-form data 104 and output data that comprises an interpretation (or comprehension) of what information is included in the free-form data 104.

After the machine learning model 116 or machine learning service 120 has generated the comprehension data for the free-form data 104, the machine learning model 116 (either the same machine learning model 116 as the machine learning model that interprets the free-form data or a different machine learning model 116) can determine a risk score of the free-form data 104. The machine learning model 116 can generate the risk score for the free-form data 104 by analyzing the comprehension data, determining whether the comprehension data indicates that the free-form data comprises sensitive information, determining a type and an amount of the sensitive information, determining how much risk is likely associated with the type and amount of sensitive information present in the free-form data, and assigning a risk score value to the amount of risk. In other words, the machine learning model 116 can be configured to receive the comprehension data and determine the risk that the free-form data 104 comprises sensitive information.

The machine learning model 116 can be further configured to compare the risk score of the free-form data 104 to a threshold risk score. The threshold risk score can be a predetermined threshold at which it has been predetermined that the free-form data 104 contains sensitive information that can pose a risk to the organization. The threshold risk score can be determined by the organization and programmed into the machine learning model 116 either at the time the machine learning model 116 is created or during training of the machine learning model 116.

In other examples, the machine learning model 116 may compare the risk score of the free-form data 104 to multiple threshold risk scores to determine appropriate actions to take. For example, if the risk score of the free-form data 104 is less than a first threshold risk score, the system 100 may permit the free-form data 104 to be stored without further action. If the risk score is greater than or equal to a second threshold risk score, the system 100 may prevent the free-form data 104 from being stored altogether. In other examples, if the risk score is greater than or equal to the first threshold risk score but less than a second threshold risk score, the system 100 may output a message to the user interface 102 (e.g., via the application 108 and the model output 106) to alert the user that the free-form data likely comprises sensitive information. Alternatively, or in addition, the system 100 may output a message asking for feedback from the user to help determine the reason for wanting to store the sensitive information. For example, the model output 106 may include one or more questions asking for clarification as to the type of sensitive information and the reason the user wants to store the sensitive information contained in the free-form data 104. In other examples, the system 100 may output one or more messages that contain training information to help the user learn the types of information that the organization does not permit to be stored. As will be appreciated by one of skill in the art, the system 100 can be configured to provide various other notifications that can help the user identify and help reduce the amount of sensitive information that is stored by the organization.

The system 100 can be further configured to perform other actions based on the risk score. For example, the system 100 can be configured to output a message to a system administrator (e.g., model output to administrator 110) to help alert members of the organization of the sensitive information if the risk score is equal to or greater than the first threshold risk score. As another example, the system 100 can be configured to output a message to a system administrator to alert the system administrator that a user is attempting to store highly-sensitive information.

If the system 100 determines that the sensitive information should be stored (i.e., either by the risk score of the free-form data being less than the threshold risk score or the user indicating that he or she would like to store the sensitive information), the system 100 can be configured to tokenize, encrypt, and track the sensitive information. For example, the system 100 can mark the sensitive information with a unique identifier so that the sensitive information can be easily identified and tracked while stored by the organization. In some examples, the system 100 can be configured to automatically delete the sensitive information after a predetermined length of time (e.g., a few days, a few months, or even a specific number of years).

The system 100 can be further configured to generate a cumulative risk score that can be reflective of a total risk that the organization has assumed by storing sensitive information. For example, the system 100 can track the number and type of sensitive information that is stored by the organization and then generate a total cumulative risk score. In this way, the disclosed technology can be utilized by the organization to quickly assess a total amount of risk the organization has assumed by storing sensitive information. As the cumulative risk score approaches a predetermined limit, the system 100 can be configured to take actions to help limit the total cumulative risk assumed by the organization. For example, as the cumulative risk score approaches a predetermined threshold, the system 100 can output a message to the system administrator to notify him or her that the organization may want to delete some of the sensitive information to help reduce the overall cumulative risk. In other examples, as the cumulative risk score approaches a predetermined threshold, the system 100 can begin to limit the amount of sensitive information that is stored by the organization by preventing new sensitive information from being stored.

As will be appreciated, the machine learning model 116 can be configured to become more accurate at identifying sensitive information and determining whether storing the sensitive information poses a risk to the organization over time. Initially, the machine learning model 116 may be a supervised machine learning model such that a human may review the data provided to the machine learning model 116 and determine whether the machine learning model 116 has properly understood the free-form data 104, properly generated a risk score, and properly determined whether the risk score indicates that the free-form data likely contains sensitive information. To help train the machine learning model 116, the system 100 can include model refinement 114 by receiving a user input 112 that comprises feedback from the user. For example, if the machine learning model 116 did not properly understand the intent or context of the free-form data 104, a user can provide a user input 112 that indicates that the comprehension data is incorrect. The machine learning model 116 can then regenerate the comprehension data and receive further feedback from the user indicative of whether the regenerated comprehension data is correct. Alternatively, or in addition, the user input 112 can include edits made by the user to the comprehension data to better describe the intent or context of the free-form data 104. The machine learning model 116 can receive the edits to the comprehension data and learn from the edits how to better generate the comprehension data.

The machine learning model 116 can store the user input 112, the generated comprehension data, the risk score in a database 118 to be accessed later by the machine learning model 116 to help train the machine learning model 116 over time. For example, as additional comprehension data, risk scores, and user inputs are stored in the database 118, the machine learning model 116 will have a greater data set from which the machine learning model 116 can learn from to become more accurate over time. The system 100 can tokenize and encrypt the user input, the comprehension data, and the risk score prior to storing each of them in the database 118 to help ensure the information remains sufficiently protected against cyber security threats.

As will be appreciated, as the machine learning model 116 is trained and becomes more accurate over time, the amount of frequency of user inputs 112 can be reduced. In other words, as the machine learning model 116 becomes more accurate over time, the need for human oversight of the machine learning model 116 can decrease and the machine learning model 116 can operate largely unsupervised.

The machine learning model 116 can be or include a neural network, a recurrent neural network, a Long Short-Term Memory (LSTM) network, a bi-direction LSTM network, a Conditional Random Fields (CRF) network, an LSTM-CRF network, a Bi-LSTM-CRF network, or other suitable machine learning models. Furthermore, the machine learning model can be configured to perform natural language processing, natural language understanding, and/or other machine learning algorithms that can be configured to interpret the free-form data 104 and determine a meaning of the data. For example, the machine learning model can include a neural network configured to perform natural language understanding to enable the machine learning model 116 to understand the meaning of the free-form data 104. As another example, the machine learning model can include a recurrent neural network configured to generate the risk score of the free-form data 104 and determine whether the risk score of the free-form data 104 is greater than or equal to a threshold risk score. In this way, the machine learning model 116 can be configured to interpret the free-form data 104 and determine whether the free-form data 104 contains sensitive information that is likely to pose a risk to the organization.

Figure 2:
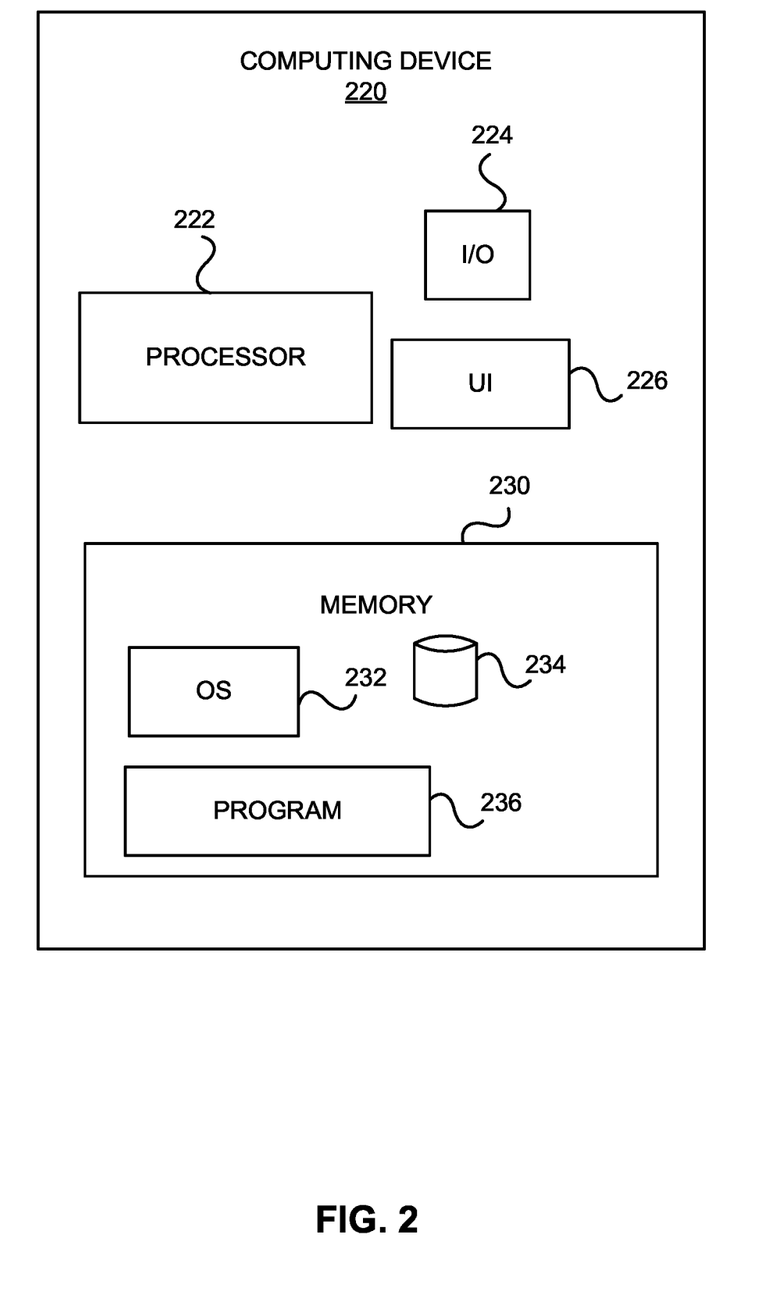
FIG. 2 illustrates an example computing device configured to identify and manage sensitive information, in accordance with an example of the disclosed technology.

FIG. 2 illustrates an example computing device configured to identify and manage sensitive information, in accordance with an example of the disclosed technology. As will be appreciated by one of skill in the art, the computing device 220 can be configured to include all or some of the features described in relation to the system 100. As shown, the computing device 220 may include a processor 222, an input/output ("I/O") device 224, a memory 230 containing an operating system ("OS") 232 and a program 236. In certain example implementations, the computing device 220 may be a single server or may be configured as a distributed computer system including multiple servers or computers that interoperate to perform one or more of the processes and functionalities associated with the disclosed embodiments. In some embodiments, computing device 220 may be one or more servers from a serverless or scaling server system. In some embodiments, the computing device 220 may further include a peripheral interface, a transceiver, a mobile network interface in communication with the processor 222, a bus configured to facilitate communication between the various components of the computing device 220, and a power source configured to power one or more components of the computing device 220.

A peripheral interface, for example, may include the hardware, firmware and/or software that enable(s) communication with various peripheral devices, such as media drives (e.g., magnetic disk, solid state, or optical disk drives), other processing devices, or any other input source used in connection with the disclosed technology. In some embodiments, a peripheral interface may include a serial port, a parallel port, a general-purpose input and output (GPIO) port, a game port, a universal serial bus (USB), a micro-USB port, a high-definition multimedia interface (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, ZigBee™, ambient backscatter communications (ABC) protocols or similar technologies.

A mobile network interface may provide access to a cellular network, the Internet, or another wide-area or local area network. In some embodiments, a mobile network interface may include hardware, firmware, and/or software that allow(s) the processor(s) 222 to communicate with other devices via wired or wireless networks, whether local or wide area, private or public, as known in the art. A power source may be configured to provide an appropriate alternating current (AC) or direct current (DC) to power components.

The processor 222 may include one or more of a microprocessor, microcontroller, digital signal processor, co-processor or the like or combinations thereof capable of executing stored instructions and operating upon stored data. The memory 230 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein may be implemented as a combination of executable instructions and data stored within the memory 230.

The processor 222 may be one or more known processing devices, such as, but not limited to, a microprocessor from the Pentium™ family manufactured by Intel™ or the Turion™ family manufactured by AMD™. The processor 222 may constitute a single core or multiple core processor that executes parallel processes simultaneously. For example, the processor 222 may be a single core processor that is configured with virtual processing technologies. In certain embodiments, the processor 222 may use logical processors to simultaneously execute and control multiple processes. The processor 222 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

In accordance with certain example implementations of the disclosed technology, the computing device 220 may include one or more storage devices configured to store information used by the processor 222 (or other components) to perform certain functions related to the disclosed embodiments. In one example, the computing device 220 may include the memory 230 that includes instructions to enable the processor 222 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In one embodiment, the computing device 220 may include a memory 230 that includes instructions that, when executed by the processor 222, perform one or more processes consistent with the functionalities disclosed herein. Methods, systems, and articles of manufacture consistent with disclosed embodiments are not limited to separate programs or computers configured to perform dedicated tasks. For example, the computing device 220 may include the memory 230 that may include one or more programs 236 to perform one or more functions of the disclosed embodiments.

The processor 222 may execute one or more programs located remotely from the computing device 220. For example, the computing device 220 may access one or more remote programs that, when executed, perform functions related to disclosed embodiments.

The memory 230 may include one or more memory devices that store data and instructions used to perform one or more features of the disclosed embodiments. The memory 230 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. The memory 230 may include software components that, when executed by the processor 222, perform one or more processes consistent with the disclosed embodiments. In some examples, the memory 230 may include a database 234 configured to store various data described herein. For example, the database 234 can be the database 118 that is configured to store data generated by the machine learning model 116, data associated with risk scores generated by the machine learning model 116, data associated with a cumulative risk score of stored sensitive information, inputs received from a user (e.g., responses to inquiries output by the machine learning model), or other data that can be used to train the machine learning model 116.

The computing device 220 may also be communicatively connected to one or more memory devices (e.g., databases) locally or through a network. The remote memory devices may be configured to store information and may be accessed and/or managed by the computing device 220. By way of example, the remote memory devices may be document management systems, Microsoft™ SQL database, SharePoint™ databases, Oracle™ databases, Sybase™ databases, or other relational or non-relational databases. Systems and methods consistent with disclosed embodiments, however, are not limited to separate databases or even to the use of a database.

The computing device 220 may also include one or more I/O devices 224 that may comprise one or more user interfaces 226 (e.g., user interface 102) for receiving signals or input from devices and providing signals or output to one or more devices that allow data to be received and/or transmitted by the computing device 220. For example, the computing device 220 may include interface components, which may provide interfaces to one or more input devices, such as one or more keyboards, mouse devices, touch screens, track pads, trackballs, scroll wheels, digital cameras, microphones, sensors, and the like, that enable the computing device 220 to receive data from a user.

In example embodiments of the disclosed technology, the computing device 220 may include any number of hardware and/or software applications that are executed to facilitate any of the operations. The one or more I/O devices 224 may be utilized to receive or collect data and/or user instructions from a wide variety of input devices. Received data may be processed by one or more computer processors as desired in various implementations of the disclosed technology and/or stored in one or more memory devices.

While the computing device 220 has been described as one form for implementing the techniques described herein, other, functionally equivalent, techniques may be employed.

For example, some or all of the functionality implemented via executable instructions may also be implemented using firmware and/or hardware devices such as application specific integrated circuits (ASICs), programmable logic arrays, state machines, etc. Furthermore, other implementations of the computing device 220 may include a greater or lesser number of components than those illustrated.

Figure 3:
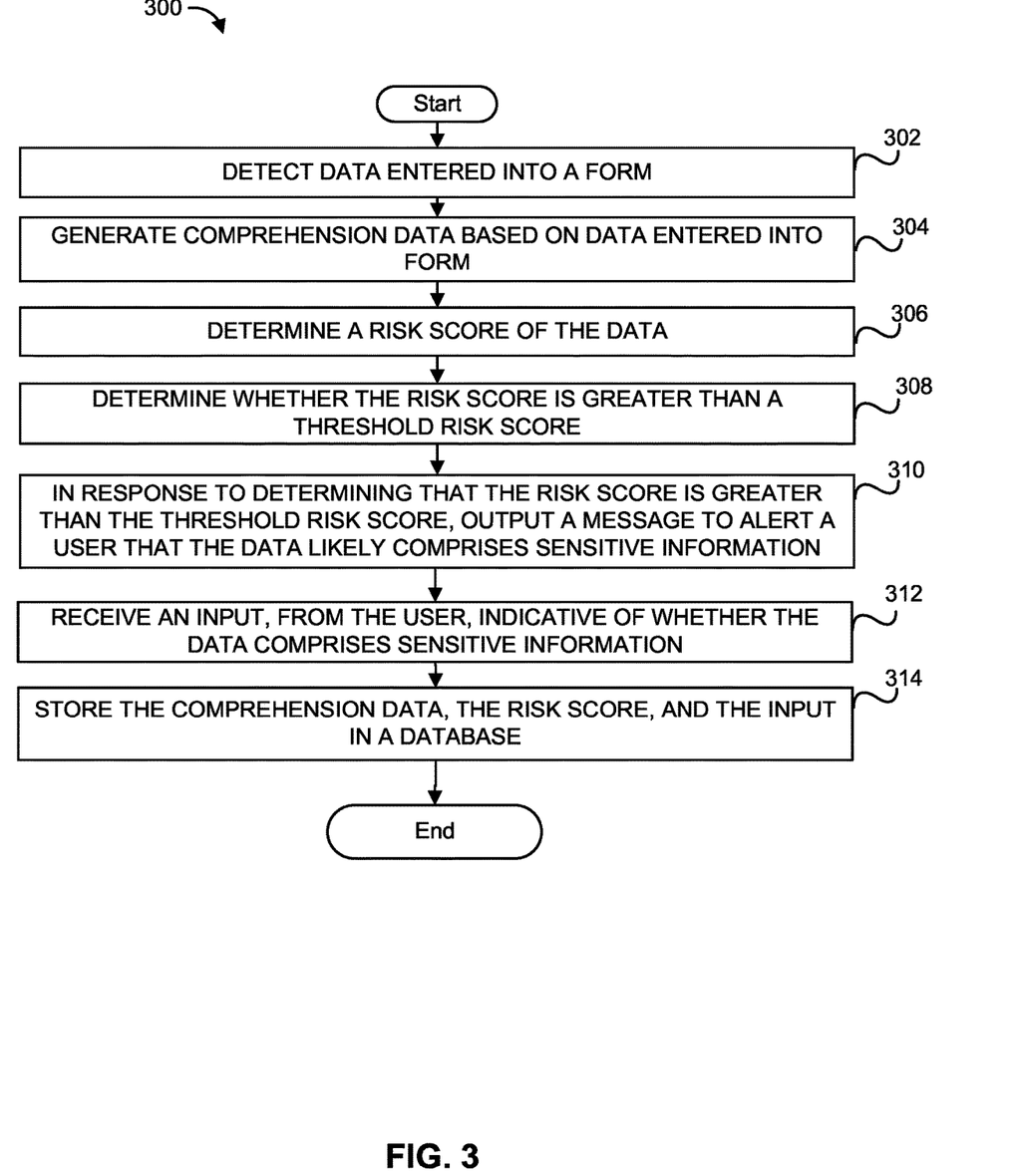
FIG. 3 is a flow diagram illustrating an exemplary method of identifying and managing sensitive information, in accordance with an example of the disclosed technology.

FIG. 3 is a flow diagram illustrating an exemplary method 300 of identifying and managing sensitive information, in accordance with an example of the disclosed technology. The method 300 can include detecting 302 data that is entered into a form on a user interface (e.g., free-form data 104) and generating 304 comprehension data based on the data entered into the form. As described herein, generating 304 the comprehension data can include utilizing a machine learning model, such as a natural language understanding model or a natural language processing model, or both, that is capable of interpreting the data and determining an intent or purpose of the data. For example, generating 304 the comprehension data can include a machine learning model that can interpret the data and determine that the data comprises sensitive information.

The method 300 can include determining 306 a risk score of the data and determining 308 whether the risk score is greater than a threshold risk score. As describe herein, determining 306 the risk score of the data can include analyzing the comprehension data, determining whether the comprehension data indicates that the free-form data comprises sensitive information, determining a type and an amount of the sensitive information, determining how much risk is likely associated with the type and amount of sensitive information present in the free-form data, and assigning a risk score value to the amount of risk. The threshold risk score can be a single threshold risk score or multiple threshold risk scores as describe previously. As will be appreciated, the threshold risk score can be a predetermined threshold at which point the comprehension data is indicative of sensitive information. The risk score can be indicative of the comprehension data indicating that the data entered into the form contains a type or amount of sensitive information that poses a certain amount of risk to the organization. A greater risk score indicates that the data contains a greater amount of, or a risky type of, sensitive information.

In response to determining 308 that the risk score is greater than the threshold risk score, the method 300 can include outputting 310 a message to alert a user that the data likely comprises sensitive information. As described previously, the message can include a simple notification indicating that the data contains sensitive information, or the message can include a request for additional information (e.g., a request asking for reasons for storing the sensitive information, what type of sensitive information does the data contain, how long should the sensitive information be stored, etc.). The method can include receiving 312 an input, from the user, indicative of whether the data comprises sensitive information. The input, for example, can be a response from the user responding to an inquiry sent along with the message asking whether the user would like to store the sensitive information.

The method 300 can further include storing 314 the data, the risk score, and the input in a database. As will be appreciated by one of skill in the art with the benefit of this disclosure, storing 314 the comprehension data, the risk score, and the input in a database can help to facilitate future training of the machine learning model to ensure the machine learning model becomes more accurate at identifying and managing sensitive information over time. In some examples, storing 314 the comprehension data, the risk score, and the input in a database can further include tokenizing and encrypting the comprehension data, risk score, and the input. As will be appreciated, the method 300 can include storing the comprehension data and the risk score without having received an input from the user. For example, if the system is not configured to output a message asking for feedback from the user, the method 300 would not need to include storing the input.

Figure 4:
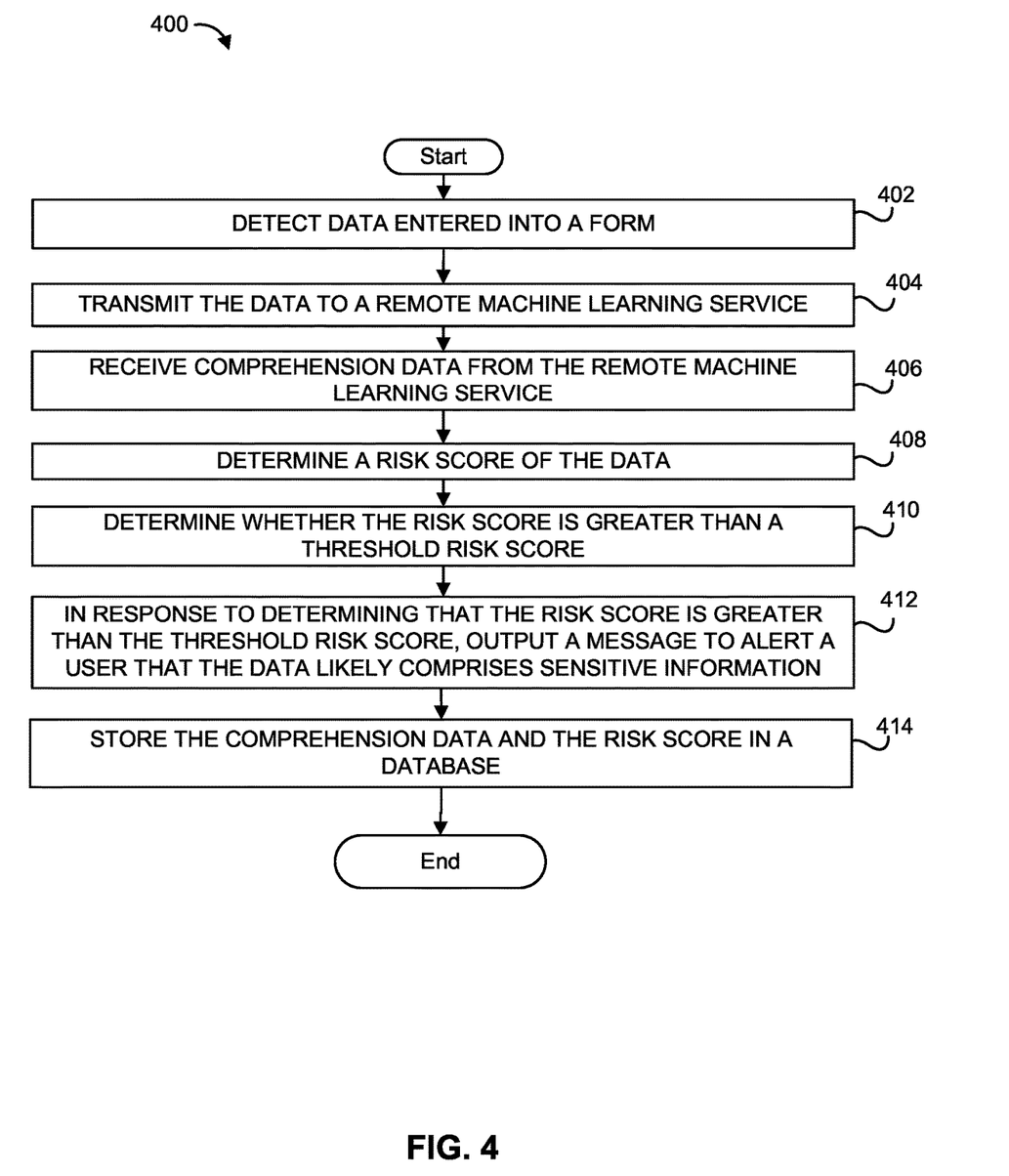
FIG. 4 is another flow diagram illustrating an exemplary method of identifying and managing sensitive information, in accordance with an example of the disclosed technology.

FIG. 4 is another flow diagram illustrating an exemplary method 400 of identifying and managing sensitive information, in accordance with an example of the disclosed technology. The method can include detecting 402 data entered into a form, similar to the method 300. The method 400 can further include transmitting 404 the data to a remote machine learning service. As described previously, transmitting 404 the data to a remote learning service can include transmitting the data to a remote machine learning service such as one offered by Google, Amazon, IBM, Microsoft, or any other machine learning service.

The method can include receiving 406 comprehension data from the remote machine learning service. In other words, the remote machine learning service can perform the function of interpreting the data entered into the form and determining the intent or meaning behind the data. The method can further include determining 408 a risk score of the data and determining 410 whether the risk score is greater than a threshold risk score.

In response to determining that the risk score is greater than the threshold risk score, the method 400 can include outputting 412 a message to alert a user that the data likely comprises sensitive information. Furthermore, as before, the method 400 can include storing 414 the comprehension data, and the risk score in a database.

Figure 5:
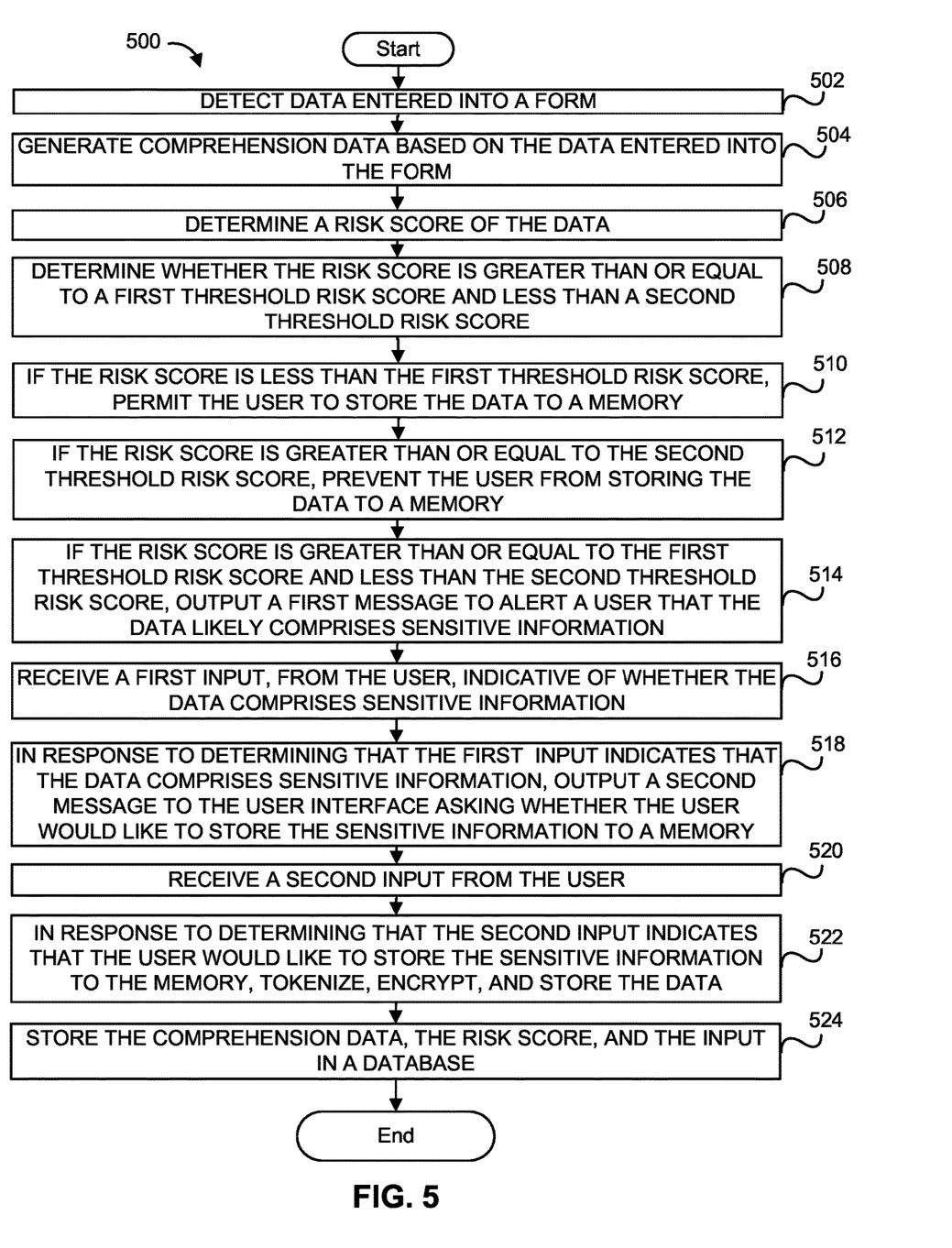
FIG. 5 is yet another flow diagram illustrating an exemplary method of identifying and managing sensitive information, in accordance with an example of the disclosed technology.

FIG. 5 is yet another flow diagram illustrating an exemplary method 500 of identifying and managing sensitive information, in accordance with an example of the disclosed technology. As before, the method 500 can include detecting 502 data entered into a form, generating 504 comprehension data based on the data entered into the form, and determining 506 a risk score of the data. The method 500 can further include determining 508 whether the risk score is greater than or equal to a first threshold risk score and less than second threshold risk score. As described herein, the first and second threshold risk scores can be predetermined threshold risk scores based on the type and amount of sensitive information that the data contains.

If the risk score is less than the first threshold risk score, the method 500 can include permitting 510 the user to store the data to a memory. If the risk score is greater than or equal to the second threshold risk score, the method 500 can include preventing 512 the user from storing the data to a memory. If the risk score is greater than or equal to the first threshold risk score and less than the second threshold risk score, the method 500 can include outputting 514 a message to alert a user that the data likely comprises sensitive information. As will be appreciated, the message can include a simple message to alert the user that the data contains sensitive information, a request for additional information, or any of the other examples described herein.

The method 500 can further include receiving 516 a first input, from the user, indicative of whether the data comprises sensitive information. The first input, for example, can be a response to an inquiry sent to the user as part of the message asking to confirm that the data comprises sensitive information. In response to determining that the first input indicates that the data comprises sensitive information, the method 500 can include outputting 518 a second message to the user interface asking whether the user would like to store the sensitive information to a memory.

The method 500 can further include receiving 520 a second input from the user. In response to determining that the second input indicates that the user would like to store the sensitive information to the memory, the method 500 can include tokenizing 522, encrypting, and storing the sensitive information to a memory. As will be appreciated, in the case where the risk score is less than the second threshold risk score but greater than or equal to the first threshold risk score, the organization may permit the user to store the sensitive information but may require additional information from the user to justify storing the sensitive information. Thus, the second input can include a response to a request for additional information to help determine whether the data should be stored. The method 500 can further include storing 524 the comprehension data, the risk score, and the input in a database to help train the machine learning model.

Exemplary Use Cases

The following exemplary use cases are offered as illustrative examples of implementations of the disclosed technology. The following exemplary use cases are offered solely for explanatory purposes and are not to be construed as limiting.

In a first example, Fred, an employee for a large corporation, enters data into a free-form text field when recording information about a customer's account during a customer service call. As part of the data entered into the free-form text field, Fred includes the customer's credit card number but attempts to obscure the customer's credit card number by written the number as a combination of numbers and letters (e.g., 1two3four . . . ). An application, operating as an extension of a web browser in which the free-form text field resides, detects the presence of the data entered into the free-form text field. The application sends the data to a machine learning model which utilizes a natural language understanding model to interpret the meaning of the data. The machine learning model then generates comprehension data which includes information that indicates that the data includes a credit card number. The machine learning model (or a separate machine learning model) then generates a risk score for the data and compares the risk score to a threshold risk score. If the risk score is greater than or equal to the threshold risk score, the system outputs a message to warn Fred that the data he has entered into the free-form text field contains sensitive information.

In some examples, Fred may decide he would like to store the data despite having been warned that the data contains sensitive information. In this case, the system can output a second message requesting additional information, including a reason for why Fred would like to store the sensitive information. The system can then tokenize, encrypt, and store the data in a memory.

Continuing with this example, Angie, an information security technician of the same large corporation that Fred works for, receives a separate alert notifying her of the sensitive information that Fred wants to store to the memory. Angie can review the sensitive information, the comprehension data, and the risk score to ensure that the machine learning model is properly interpreting and scoring the sensitive information. Angie can provide feedback to the machine learning model (e.g., a simple yes/no input to confirm whether the data comprises sensitive information, edit the comprehension data to clarify the meaning of the data, adjust the risk score, etc.) to help further train the machine learning model.

As another example, Joe, a volunteer and a non-profit organization, enters data into a free-form text field while collecting information as part of the intake process for the non-profit organization. An application operating in the background, detects the data entered into the free-form text field and send the data to Amazon's remote machine learning service. The remote machine learning service generates comprehension data indicative of the meaning behind the data and outputs the comprehension data to the non-profit organization's machine learning model. The machine learning model determines, based on the comprehension data, that Joe has entered a social security number as part of the data. The machine learning model then generates a risk score for the data and compares the risk score to a first risk score threshold and a second risk score threshold. The first risk score threshold is a threshold at which the organization has determined that the data contains sensitive information that could potentially pose a risk to the non-profit organization while the second risk score threshold is a threshold at which the organization has determined that the data definitely poses a risk to the non-profit organization and, therefore, should not be stored by the organization.

The machine learning model determines that the risk score for the data is greater than the first threshold risk score but less than the second threshold risk score. In this instance, the non-profit organization has determined that only some data within this risk score range should be stored. To help determine whether the data entered by Joe should be stored, a message is output by the application to alert Joe that the data contains sensitive information and to ask for additional justification for why Joe wishes to store the sensitive information. Upon receiving the message, Joe provides an input to the application indicating that Joe must store the sensitive information to help identify the client. The system then tokenizes, encrypts, and stores the data to a memory. In some examples, the system can further assign the data a specific amount of time that the data can be stored and set the data for automatic deletion after the specific amount of time.

The system can further determine an overall cumulative risk score that the non-profit organization has assumed by stored sensitive information. This cumulative risk score can be updated with each addition or removal of stored sensitive information. In this way, the system can enable to non-profit organization to see a real-time risk score associated with all of the sensitive information stored by the non-profit organization.

In some examples, disclosed systems or methods may involve one or more of the following clauses:

Clause 1: A method of identifying and managing sensitive information, the method comprising: detecting, by an application of a computing device, data entered into a form on a user interface; generating, by a natural language understanding model, comprehension data based on the data entered into the form; determining, by a machine learning model and based on the comprehension data, a risk score of the data, the risk score being indicative of a likelihood that the data comprises sensitive information; determining whether the risk score is greater than or equal to a threshold risk score; in response to determining that the risk score is greater than or equal to the threshold risk score, outputting a message to the user interface to alert a user that the data likely comprises sensitive information; receiving, from the user via the user interface, an input indicative of whether the data comprises sensitive information; and tokenizing, encrypting, and storing the comprehension data, the risk score, and the input in a database.

Clause 2: The method of Clause 1, wherein the machine learning model is trained based on the data, the comprehension data, the risk score, and the input.

Clause 3: The method of Clause 1, further comprising: in response to determining that the risk score is less than the threshold risk score, permitting the user to store the data to a memory.

Clause 4: The method of Clause 1, wherein the message comprises a first message and the input comprises a first input, the method further comprising: in response to determining that the first input indicates that the data comprises sensitive information, outputting a second message to the user interface asking whether the user would like to store the sensitive information to a memory; receiving, from the user via the user interface, a second input; and in response to determining that the second input indicates that the user would like to store the sensitive information to the memory: tokenizing the data; encrypting the data; and storing the data in the memory.

Clause 5: The method of Clause 1, wherein the threshold risk score comprises a first threshold risk score, the method further comprising: determining whether the risk score is greater than or equal to a second threshold risk score, the second threshold risk score being greater than the first threshold risk score; and in response to determining that the risk score is greater than or equal to the second threshold risk score, preventing the user from storing the data to a memory.

Clause 6: The method of Clause 5, wherein the message comprises a first message and the input comprises a first input, the method further comprising: in response to determining that the risk score is greater than or equal to the first threshold risk score and less than the second threshold risk score, outputting a second message to the user interface asking whether the user would like to store the sensitive information to a memory; receiving, from the user via the user interface, a second input; and in response to determining that the second input indicates that the user would like to store the sensitive information to the memory: tokenizing the data; encrypting the data; and storing the data in the memory.

Clause 7: The method of Clause 1, wherein the machine learning model comprises a recurrent neural network.

Clause 8: A method of identifying and managing sensitive information, the method comprising: detecting, by an application of a computing device, data entered into a form on a user interface; transmitting, by the application of the computing device, the data to a remote machine learning service, the remote machine learning service comprising a natural language understanding model; receiving, from the remote machine learning service, comprehension data indicative of a context of the data as determined by the remote machine learning service; determining, by a machine learning model and based on the comprehension data, a risk score of the data, the risk score being indicative of a likelihood that the data comprises sensitive information; determining whether the risk score is greater than or equal to a threshold risk score; in response to determining that the risk score is greater than or equal to the threshold risk score, outputting a message to the user interface to alert a user that the data likely comprises sensitive information; and tokenizing, encrypting, and storing the comprehension data and the risk score in a database.

Clause 9: The method of Clause 8, wherein the machine learning model is trained based on the comprehension data and the risk score.

Clause 10: The method of Clause 8, further comprising: receiving, from the user via the user interface, an input indicative of whether the data comprises sensitive information; and storing the input in the database, wherein the machine learning model is trained based on the comprehension data, the risk score, and the input.

Clause 11: The method of Clause 10, wherein the message comprises a first message and the input comprises a first input, the method further comprising: in response to determining that the first input indicates that the data comprises sensitive information, outputting a second message to the user interface asking whether the user would like to store the sensitive information to a memory; receiving, from the user via the user interface, a second input; and in response to determining that the second input indicates that the user would like to store the sensitive information to the memory: tokenizing the data; encrypting the data; and storing the data in the memory.

Clause 12: The method of Clause 8, further comprising: in response to determining that the risk score is less than the threshold risk score, permitting the user to store the data to a memory.

Clause 13: The method of Clause 8, wherein the threshold risk score comprises a first threshold risk score, the method further comprising: determining whether the risk score is greater than or equal to a second threshold risk score, the second threshold risk score being greater than the first threshold risk score; and in response to determining that the risk score is greater than or equal to the second threshold risk score, preventing the user from storing the data to a memory.

Clause 14: A system for identifying and managing sensitive information, the system comprising: one or more processors; and a memory in communication with the one or more processors and storing instructions that are configured to cause the system to: detect data entered into a form on a user interface; generate, by a natural language understanding model, comprehension data based on the data entered into the form; determine, by a machine learning model and based on the comprehension data, a risk score of the data, the risk score being indicative of a likelihood that the data comprises sensitive information; determine whether the risk score is greater than or equal to a threshold risk score; in response to determining that the risk score is greater than or equal to the threshold risk score, output a message to the user interface to alert a user that the data likely comprises sensitive information.

Clause 15: The system of Clause 14, wherein the instructions are further configured to cause the system to: receive, from the user via the user interface, an input indicative of whether the data comprises sensitive information; and store the comprehension data, the risk score, and the input in a database, wherein the machine learning model is trained based on the data, the comprehension data, the risk score, and the input.

Clause 16: The system of Clause 14, wherein the instructions are further configured to cause the system to: in response to determining that the risk score is less than the threshold risk score, permit the user to store the data to a memory.

Clause 17: The system of Clause 15, wherein the message comprises a first message, the instructions being further configured to: receive, from the user via the user interface, a first input indicative of whether the data comprises sensitive information; in response to determining that the first input indicates that the data comprises sensitive information, output a second message to the user interface asking whether the user would like to store the sensitive information to a memory; receive, from the user via the user interface, a second input; and in response to determining that the second input indicates that the user would like to store the sensitive information to the memory: tokenize the data; encrypt the data; and store the data in the memory.

Clause 18: The system of Clause 14, wherein the threshold risk score comprises a first threshold risk score, the instructions being further configured to: determine whether the risk score is greater than or equal to a second threshold risk score, the second threshold risk score being greater than the first threshold risk score; and in response to determining that the risk score is greater than or equal to the second threshold risk score, prevent the user from storing the data to a memory.

Clause 19: The system of Clause 18, wherein the message comprises a first message, the instructions being further configured to: in response to determining that the risk score is greater than or equal to the first threshold risk score and less than the second threshold risk score, output a second message to the user interface asking whether the user would like to store the sensitive information to a memory; receive, from the user via the user interface, an input; and in response to determining that the input indicates that the user would like to store the sensitive information to the memory: tokenize the data; encrypt the data; and store the data in the memory.

Clause 20: The system of Clause 14, wherein the machine learning model comprises a recurrent neural network.

The features and other aspects and principles of the disclosed embodiments may be implemented in various environments. Such environments and related applications may be specifically constructed for performing the various processes and operations of the disclosed embodiments or they may include a general-purpose computer or computing platform selectively activated or reconfigured by program code to provide the necessary functionality. Further, the processes disclosed herein may be implemented by a suitable combination of hardware, software, and/or firmware. For example, the disclosed embodiments may implement general purpose machines configured to execute software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by general purpose machines as computer processing instructions, all or a portion of the functionality of the disclosed embodiments may be implemented instead in dedicated electronics hardware.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low-level software instructions, such as machine code (e.g., such as that produced by a compiler) and/or high-level code that can be executed by a processor using an interpreter.

The technology disclosed herein typically involves a high-level design effort to construct a computational system that can appropriately process unpredictable data. Mathematical algorithms may be used as building blocks for a framework, however certain implementations of the system may autonomously learn their own operation parameters, achieving better results, higher accuracy, fewer errors, fewer crashes, and greater speed.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

It is to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Although embodiments are described herein with respect to systems or methods, it is contemplated that embodiments with identical or substantially similar features may alternatively be implemented as systems, methods and/or non-transitory computer-readable media.

As used herein, unless otherwise specified, the use of the ordinal adjectives "first," "second," "third," etc., to describe a common object, merely indicates that different instances of like objects are being referred to, and is not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A method of identifying and managing sensitive information, the method comprising:
   detecting, by an application of a computing device, data entered into a form on a user interface;
   generating, by a natural language understanding model, comprehension data based on the data entered into the form;
   determining, by a machine learning model and based on the comprehension data, a risk score of the data, the risk score being indicative of a likelihood that the data comprises sensitive information;
   determining whether the risk score is greater than or equal to a threshold risk score;
   in response to determining that the risk score is greater than or equal to the threshold risk score, outputting a first message to the user interface to alert a user that the data likely comprises sensitive information;
   receiving, from the user via the user interface, a first input indicative of whether the data comprises sensitive information;
   in response to determining that the first input indicates that the data comprises sensitive information, outputting a second message to the user interface asking whether the user would like to store the sensitive information to a memory;
   receiving, from the user via the user interface, a second input;
   in response to determining that the second input indicates that the user would like to store the sensitive information to the memory:
      tokenizing the data;
      encrypting the data; and
      storing the data in the memory; and
   tokenizing, encrypting, and storing the comprehension data, the risk score, and the first input in a database.

2. The method of claim 1, wherein the machine learning model is trained based on the data, the comprehension data, the risk score, and the first input.

3. The method of claim 1, further comprising:
in response to determining that the risk score is less than the threshold risk score, permitting the user to store the data to the memory.

4. The method of claim 1, wherein the threshold risk score comprises a first threshold risk score, the method further comprising:
determining whether the risk score is greater than or equal to a second threshold risk score, the second threshold risk score being greater than the first threshold risk score; and
in response to determining that the risk score is greater than or equal to the second threshold risk score, preventing the user from storing the data to the memory.

5. The method of claim 4, further comprising:
in response to determining that the risk score is greater than or equal to the first threshold risk score and less than the second threshold risk score, outputting a third message to the user interface asking whether the user would like to store the sensitive information to the memory;
receiving, from the user via the user interface, a third input; and
in response to determining that the third input indicates that the user would like to store the sensitive information to the memory:
tokenizing the data;
encrypting the data; and
storing the data in the memory.

6. The method of claim 1, wherein the machine learning model comprises a recurrent neural network.

7. A method of identifying and managing sensitive information, the method comprising:
detecting, by an application of a computing device, data entered into a form on a user interface;
transmitting, by the application of the computing device, the data to a remote machine learning service, the remote machine learning service comprising a natural language understanding model;
receiving, from the remote machine learning service, comprehension data indicative of a context of the data as determined by the remote machine learning service;
determining, by a machine learning model and based on the comprehension data, a risk score of the data, the risk score being indicative of a likelihood that the data comprises sensitive information;
determining whether the risk score is greater than or equal to a threshold risk score;
in response to determining that the risk score is greater than or equal to the threshold risk score, outputting a first message to the user interface to alert a user that the data likely comprises sensitive information;
receiving, from the user via the user interface, a first input indicative of whether the data comprises sensitive information;
in response to determining that the first input indicates that the data comprises sensitive information, outputting a second message to the user interface asking whether the user would like to store the sensitive information to a memory;
receiving, from the user via the user interface, a second input;
in response to determining that the second input indicates that the user would like to store the sensitive information to the memory:
tokenizing the data;
encrypting the data; and
storing the data in the memory; and
tokenizing, encrypting, and storing the first input, the comprehension data, and the risk score in a database, wherein the machine learning model is trained based on the comprehension data, the risk score, and the first input.

8. The method of claim 7, wherein the machine learning model is trained based on the comprehension data and the risk score.

9. The method of claim 7, further comprising:
in response to determining that the risk score is less than the threshold risk score, permitting the user to store the data to the memory.

10. The method of claim 7, wherein the threshold risk score comprises
a first threshold risk score, the method further comprising:
determining whether the risk score is greater than or equal to a second threshold risk score, the second threshold risk score being greater than the first threshold risk score; and
in response to determining that the risk score is greater than or equal to the second threshold risk score, preventing the user from storing the data to the memory.

11. A system for identifying and managing sensitive information, the system comprising:
one or more processors; and
a memory in communication with the one or more processors and storing instructions that are configured to cause the system to:
detect data entered into a form on a user interface;
generate, by a natural language understanding model, comprehension data based on the data entered into the form;
determine, by a machine learning model and based on the comprehension data, a risk score of the data, the risk score being indicative of a likelihood that the data comprises sensitive information;
determine whether the risk score is greater than or equal to a threshold risk score;
in response to determining that the risk score is greater than or equal to the threshold risk score, output a first message to the user interface to alert a user that the data likely comprises sensitive information;
receive, from the user via the user interface, a first input indicative of whether the data comprises sensitive information;
in response to determining that the first input indicates that the data comprises sensitive information, output a second message to the user interface asking whether the user would like to store the sensitive information to the memory;
receive, from the user via the user interface, a second input; and
in response to determining that the second input indicates that the user would like to store the sensitive information to the memory:
tokenize the data;
encrypt the data; and
store the data in the memory.

12. The system of claim 11, wherein the instructions are further configured to cause the system to:

receive, from the user via the user interface, an input indicative of whether the data comprises sensitive information; and store the comprehension data, the risk score, and the input in a database, wherein the machine learning model is trained based on the data, the comprehension data, the risk score, and the input.

13. The system of claim 11, wherein the instructions are further configured to cause the system to:

in response to determining that the risk score is less than the threshold risk score, permit the user to store the data to the memory.

14. The system of claim 11, wherein the threshold risk score comprises a first threshold risk score, the instructions being further configured to:

determine whether the risk score is greater than or equal to a second threshold risk score, the second threshold risk score being greater than the first threshold risk score; and in response to determining that the risk score is greater than or equal to the second threshold risk score, prevent the user from storing the data to the memory.

15. The system of claim 14, wherein the instructions are further configured to:

in response to determining that the risk score is greater than or equal to the first threshold risk score and less than the second threshold risk score, output a second message to the user interface asking whether the user would like to store the sensitive information to a memory;

receive, from the user via the user interface, an input; and in response to determining that the input indicates that the user would like to store the sensitive information to the memory:

tokenize the data;

encrypt the data; and store the data in the memory.

16. The system of claim 11, wherein the machine learning model comprises a recurrent neural network.

\* \* \* \* \*